United States Patent [19]

Klepper et al.

[11] Patent Number: 4,648,276

[45] Date of Patent: Mar. 10, 1987

[54] APPARATUS FOR MEASURING THE CHARACTERISTICS OF AN ULTRASONIC WAVE MEDIUM

[76] Inventors: John R. Klepper, 3238 Twenty Third Ave., W., Seattle, Wash. 98199; John M. Reid, 722 Upper Gulph Rd., Strafford, Pa. 19087; Hirohide Miwa, 6-7-10, Miyazaki, Miyamae-ku, Kawasaki-shi, Kanagawa 213, Japan; Takaki Shimura, 29-44, Tsurukawa 4-chome, Machida-shi, Tokyo 194-01, Japan; Keiichi Murakami, 17-305-2-8-6, Teraodai, Tama-ku, Kawasaki-shi, Kanagawa 214, Japan

[21] Appl. No.: 616,472

[22] Filed: Jun. 1, 1984

Related U.S. Application Data

[63] Continuation-in-part of Ser. No. 574,690, Jan. 27, 1984, Pat. No. 4,534,220.

[51] Int. Cl.$^4$ ............................................ G01N 29/00
[52] U.S. Cl. ........................................ 73/599; 73/602
[58] Field of Search .................... 73/599, 602, 620; 128/660; 364/821, 828, 731

[56] References Cited

U.S. PATENT DOCUMENTS

| | | | |
|---|---|---|---|
| 4,202,215 | 5/1980 | Heyer | 73/599 |
| 4,414,850 | 11/1983 | Miwa et al. | 73/602 |

FOREIGN PATENT DOCUMENTS

| | | |
|---|---|---|
| 58-77226 | 4/1983 | Japan . |
| 58-142893 | 8/1983 | Japan . |

OTHER PUBLICATIONS

Beasley, Eric W. et al., "A Quantitative Analysis of Sea Clutter Decorrelation with Frequency Agility," *IEEE Transactions on Aerospace and Electronic Systems*, vol. AES-4, No. 3, May 1968, pp. 468-473.
Gustafson, B. G. et al., "System Properties of Jumping-Frequency Radars," *Philips Telecommunication Review*, vol. 25, No. 1, Jul. 1964, pp. 70-76.
Ray, Howard, "Improving Radar Range and Angle Detection with Frequency Agility," *The Microwave Journal*, May 1966, pp. 63-68.
Bilgutay, N. M. et al., "Flaw-to-Grain Echo Enhancement," *Proc. Ultrasonics International*, '79, Graz, Austria, pp. 152-157.
Bilgutay, N. M. et al., "Flaw Visibility Enhancement by Split-Spectrum Processing Techniques", 1981 *IEEE Ultrasonic Symposium*, Chicago, Ill.
Kuc, Roman et al., "Parametric Estimation of the Acoustic Attenuation Coefficient Slope for Soft Tissue", 1976 *Ultrasonics Symposium Proceedings*, IEEE Cat. #76, pp. 44-47.

*Primary Examiner*—Stephen A. Kreitman
*Attorney, Agent, or Firm*—Staas & Halsey

[57] ABSTRACT

The present invention relates to an apparatus which determines the distribution of the attenuation slope coefficient on a real-time basis using the center frequency shift. In one embodiment, the phase difference between a received signal and a reference signal is determined using EXCLUSIVE OR gates or an inverse trigonometric relation stored in a ROM. The phase difference is input to a differentiator which outputs the center frequency shift of the received signal on a real-time basis. The center frequency shift is input to another differentiator which outputs the attenuation slope coefficient. In other embodiments, the received signal is distributed into received signal bands, having different center frequencies, and signal characteristics of the received signal bands are averaged to remove virtually all effects of spectrum scalloping in the time domain. Thus, the attenuation slope coefficient is obtained without the effects of spectrum scalloping using simple hardware and without Fourier transformation.

24 Claims, 22 Drawing Figures

APPARATUS FOR MEASURING THE CHARACTERISTICS OF AN ULTRASONIC WAVE MEDIUM

CROSS-REFERENCE TO RELATED APPLICATION

This application is a continuation-in-part of application Ser. No. 574,690, filed Jan. 27, 1984, now U.S. Pat. No. 4,534,220.

BACKGROUND OF THE INVENTION

This invention relates to an apparatus for measuring the distribution of ultrasonic wave characteristics in a medium, particularly to an apparatus utilizing the center frequency shift method for measuring ultrasonic wave attenuation constant distribution with high spatial resolution on a real time basis using simple hardware, without obtaining a reflected wave spectrum and including the ability to remove spectrum scalloping in the time domain.

The center frequency shift method is a known method for obtaining the attenuation constant in an ultrasonic wave medium. In this method, as illustrated in FIG. 1, the power spectrum $A(f)$ of a transmitted ultrasonic wave has a Gaussian distribution expressed as $$A(f) = K e^{-[(f-f_0)^2 / 2\sigma^2]} \tag{1}$$

In equation (1), K is a constant, the standard deviation $\sigma$ is a constant proportional to the bandwidth and dependent on the shape of the spectrum of the transmitted ultrasonic wave and $f_o$ is the center frequency. The power spectrum of the received signal $A'(f)$ also has a Gaussian distribution which is expressed as follows, where $f_r$ is the center frequency of the received signal:

$$A'(f) = K' e^{-[(f-f_r)^2 / 2\sigma^2]} \tag{2}$$

If it is assumed that the attenuation within the medium has the form:

$$e^{-4f \int_0^z \beta(z) dz} \tag{2a}$$

where z is the distance between the transmitting/receiving transducer and the reflecting surface, f is the frequency, $\beta$ is the attenuation slope coefficient and "4" allows for traversing the distance z twice and conversion of pressure into power, then $K'$ and $f_r$ are defined by the following equations:

$$K' = K e^{\dfrac{\left[ f_o - 4\sigma^2 \int_0^z \beta(z)dz \right]^2 - f_o^2}{2\sigma^2}} \tag{3}$$

$$f_r = f_o - 4\sigma^2 \int_0^z \beta(z) dz \tag{4}$$

Therefore, the attenuation slope coefficient $\beta$ can be obtained in the form indicated below by detecting the center frequency $f_r$ of the received signal.

$$\beta(z) = (\tfrac{1}{4}\sigma^{-2}) d/dz(f_o - f_r) \tag{5}$$

However, the received signal waveform is distorted and its spectrum deviates from a Gaussian distribution, and therefore the center frequency cannot be obtained easily. To overcome this problem, the following method has been used by the prior art to obtain the center frequency $f_r$. The power spectrum $|P(f)|^2$ is first obtained by a Fourier transformation of the time domain waveform of the received signal for a certain time window T, and then the average frequency $\bar{f}$ is obtained according to equation (6) as the first moment of the power spectrum.

$$\bar{f} = \dfrac{\int_0^\infty f |P(f)|^2 df}{\int_0^\infty |P(f)|^2 df} \tag{6}$$

The average frequency $\bar{f}$ is then used as the center frequency $f_r$ in equation (5) and a value for the attenuation slope coefficient $\beta$ is obtained using equation (5). A drawback of this method is the relatively large amount of time required for calculating the power spectrum and the first moment, and therefore, it has been difficult to obtain the distribution of $\beta$ on a real time basis.

In addition to deviation from a Gaussian distribution, the power spectrum of the received signal is subjected to "spectrum scalloping", which is caused by overlapping of the pulses in the received signal waveform due to reflection from random reflectors located close together in the medium. One attempt to remove spectrum scalloping in the application of ultrasonic wave detection for medical diagnosis has been to average echo envelope signals for several frequency bands. The object of this method is to remove the "speckle pattern" in the B-mode imaging. The speckle pattern is caused by interference from the spectrum scalloping and prevents the detection of small focal lesions. The speckle pattern varies with the frequency, so the averaging is effective in reducing the speckle pattern in the B-mode. This method uses linear processing and reduces the spatial resolution of the B-mode image. As a result, prior art devices using this method cannot be used for diagnosis of small focal lesions but only for diffusive lesions of a large organ such as the liver.

Spectrum scalloping can be broken into two types, slow scalloping, caused by reflection points which are very close together and rapid scalloping, caused by reflection points which are further apart. One of the inventors of the present invention developed a method for removing rapid scalloping, as diclosed in Japanese Patent Application No. 58-45396, incorporated herein by reference. This method employs a lifter in spectrum to remove rapid scallop, inverse transforms to the power spectrum and calculation of higher order moments such as $M_2$ and $M_3$ of the power spectrum. This method may be used to recover the true centroid from a power spectrum distorted by scallop and frequency dependent reflection. The drawback of this method is that it requires a great deal of processing in the frequency domain. If the processing is performed by hardwired circuitry to obtain the attenuation slope coefficient $\beta$ as fast as possible, the cost of the equipment is extremely high. If some of the processing is performed by a programmed microcomputer, real-time calculation is not possible.

In order to avoid calculation in the frequency domain, methods have been developed, as disclosed in Japanese Patent Application Nos. 58-7726 and 58-142893, both incorporated herein by reference, which calculate the moments of the power spectrum without using Fourier transformation. In these methods, the inphase and quadrature components of the received signal waveform or the autocorrelation function of the received signal waveform are used to calculate the moments of the power spectrum. While these methods do generate the attenuation slope coefficient $\beta$ in real time, they do not remove the effects of spectrum scalloping.

Methods used in other fields to remove unwanted signal characteristics have been considered in attempting to solve the problems of the prior art. "Frequency agility" is used in radar systems as disclosed in Beasley, E. W. and Ward, H. R., "A Quantitative Analysis of Sea Clutter Decorrelation with Frequency Agility", *IEEE. Transactions on Aerospace and Electronic Systems*, Vol. 4, (1968), pps. 468–473; Gustafson, B. G. and As, B. 0., "System Properties of Jumping Frequency Radars", Philips *Telecommunication Review*, Vol. 25, (1964), pps. 70–76; and Ray, H. "Improving Radar Range and Angle Detection with Frequency Agility", Microwave Journal, Vol. 9, (1966), pps. 63–68. Ultrasonic flaw detection systems use "spectrum wobbling", disclosed in Koryachenko, V. D., "Statistical Processing of Flaw Detector Signals to Enhance the Signal-to-Noise Ratio Associated with Structural Reverberation Noise", Soviet Journal of Non-Destructive Testing, Vol. 11, (1975), pps. 69–75, and "split spectrum", disclosed in Newhouse, V. L., et al., "Flaw-to-Grain Echo Enhancement", *Proceedings of Ultrasonics International '79*, Graz, Austria, (1979), pp. 152–157 and Newhouse, V. L. and Bilgutay, N. M. et al., "Flaw Visbility Enhancement by Split-Spectrum Processing Techniques", Proceedings '81 IEEE Ultrasonics Symposium, (1981). The radar techniques vary the transmitted frequency periodically to decorrelate (randomize) the clutter echoes and use non-linear processing such as square-law-detection and averaging over the frequencies transmitted. Spectrum wobbling is a similar technique used in ultrasonic flaw detection. In the split-spectrum method, a single wideband pulse is transmitted and the received signal is separated by several filters. In both the spectrum wobbling and split-spectrum methods, the resulting signals are cross-correlated using non-linear processing and then averaged to suppress the grain echoes of the material being tested for flaws.

Thus, both the radar and flaw detection systems are designed to suppress parts of the received signals such as grain and clutter and to emphasize the "specular boundary" or shape of the object reflecting the signal. The objective of the present invention is to produce the opposite effect, that is, to suppress those parts of the signal indicating specular boundaries and to emphasize those characteristics of the signal which indicate the nature of the object reflecting the signal. In summary, no prior art method or apparatus has been disclosed which can obtain ultrasonic wave characteristics of a medium, including the attenuation slope coefficient $\beta$, without any spectrum scalloping in real time using low-cost equipment.

SUMMARY OF THE INVENTION

An object of the present invention is to overcome the problems of the prior art by providing a system for obtaining ultrasonic wave characteristics which removes spectrum scalloping in the time domain.

Another object of the present invention is to provide a system which obtains the distribution of the attenuation slope coefficient on a real-time basis by estimating the center frequency of a received signal from a profile of the phase difference between the received signal and a reference signal and by estimating a shift of the center frequency of the received signal on a real-time basis using simple hardware and without calculating the power spectrum and the first moment in the power domain.

Yet another object of the present invention is to provide a system for obtaining ultrasonic wave characteristics including the attenuation slope coefficient which removes effects of frequency independent reflection.

The above objects can be attained by providing a circuit which determines the phase difference between a received signal and a reference signal and passes the phase difference through a differentiating circuit to find the amount of frequency shift between the frequencies of the received signal and the reference signal. The signal representing the frequency shift amount passes through another differentiating circuit and is multiplied by a constant to find the attenuation slope coefficient. Several embodiments of the present invention utilize a quadrature detector circuit and a signal conversion circuit to find the phase difference between the reference and received signals. The quadrature detector circuit multiplies the received signal by the reference signal and by the reference signal shifted by 90° to generate two components defining this phase difference. These components and a trigonometric table stored in a ROM are used to find the phase difference in the signal conversion circuit. Another embodiment of the present invention generates the phase difference by passing the input signal simultaneously through two EXCLUSIVE OR circuits, the other input of one of the EXCLUSIVE OR circuits being the reference signal and the other EXCLUSIVE OR circuit receiving a signal corresponding to the reference signal shifted by 90°. From the output of these two EXCLUSIVE OR circuits, the phase difference can be determined. As a result, the apparatus according to the present invention obtains the attenuation slope coefficient without using the power spectrum and is therefore less expensive and operates in real time.

The apparatus according to the present invention removes all effects of spectrum scalloping by distributing the received signal into received signal bands and calculating signal characteristics for each of the received signal bands. An averaging circuit averages the signal characteristics and subsequent circuits provide any further processing necessary to output the tissue characteristics including the attenuation slope coefficient. In place of calculation of the phase difference as one of the signal characteristics, circuits calculate the autocorrelation function for each of the received signal bands in one of the embodiments, and then calculate moments of the power spectrum from which an average frequency and the attenuation slope coefficient can be calculated.

The above objects, together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
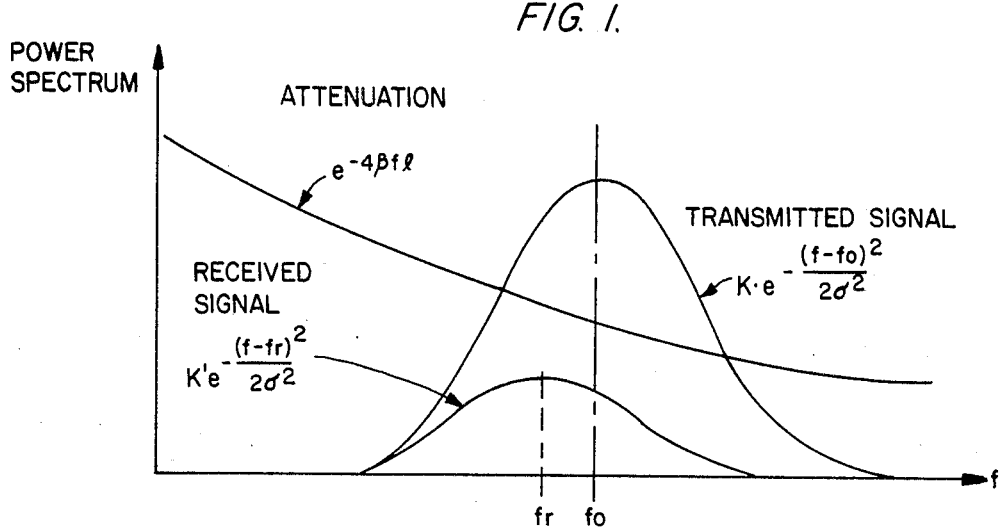
FIG. 1 is a graph of the power spectrum of transmitted and received signals.

An apparatus according to the present invention determines the attenuation slope coefficient $\beta$ in real time instead of obtaining the power spectrum and the first moment. The phase of a received signal is compared with a reference signal, and if the phase difference is constant, the received signal has the same frequency as the reference signal. If the phase of the received signal increases over time compared to the reference signal, the received signal has a higher frequency, whereas if it decreases, the received signal has a lower frequency than the reference signal. Using this basic relationship between phase and frequency, the frequency difference $f_r - \nu$ between the received frequency $f_r$ and the reference frequency $\nu$ is obtained by differentiating the phase difference with respect to time, and the attenuation slope coefficient $\beta$ is then obtained from equation (5).

The reference signal x(t) and received signal y(t), which is an echo signal representing sonic pressure, can be represented by the following equations in which $\nu$, $\theta_o$, $f_r$ and $\theta_r$ are constant if one uses the average frequency $\bar{f}$ for $f_r$ when the received signal has a wide frequency band:

$$x(t) = \sin(2\pi\nu t + \theta_o) \quad (7)$$

$$y(t) = \sin(2\pi f_r t + \theta_r) \quad (8)$$

The phase difference $\phi_o(t)$ of the received signal can then be represented as:

$$\phi_o(t) = 2\pi(f_r - \nu)t + (\theta_r - \theta_o) \quad (9)$$

and differentiating the above formula with respect to time leads to:

$$d\phi_o(t)/dt = 2\pi(f_r - \nu) \quad (10)$$

From equations (5) and (10) it is easy to see that the attenuation slope coefficient $\beta$ can be found using $d\phi_o/dt$.

Figure 2:
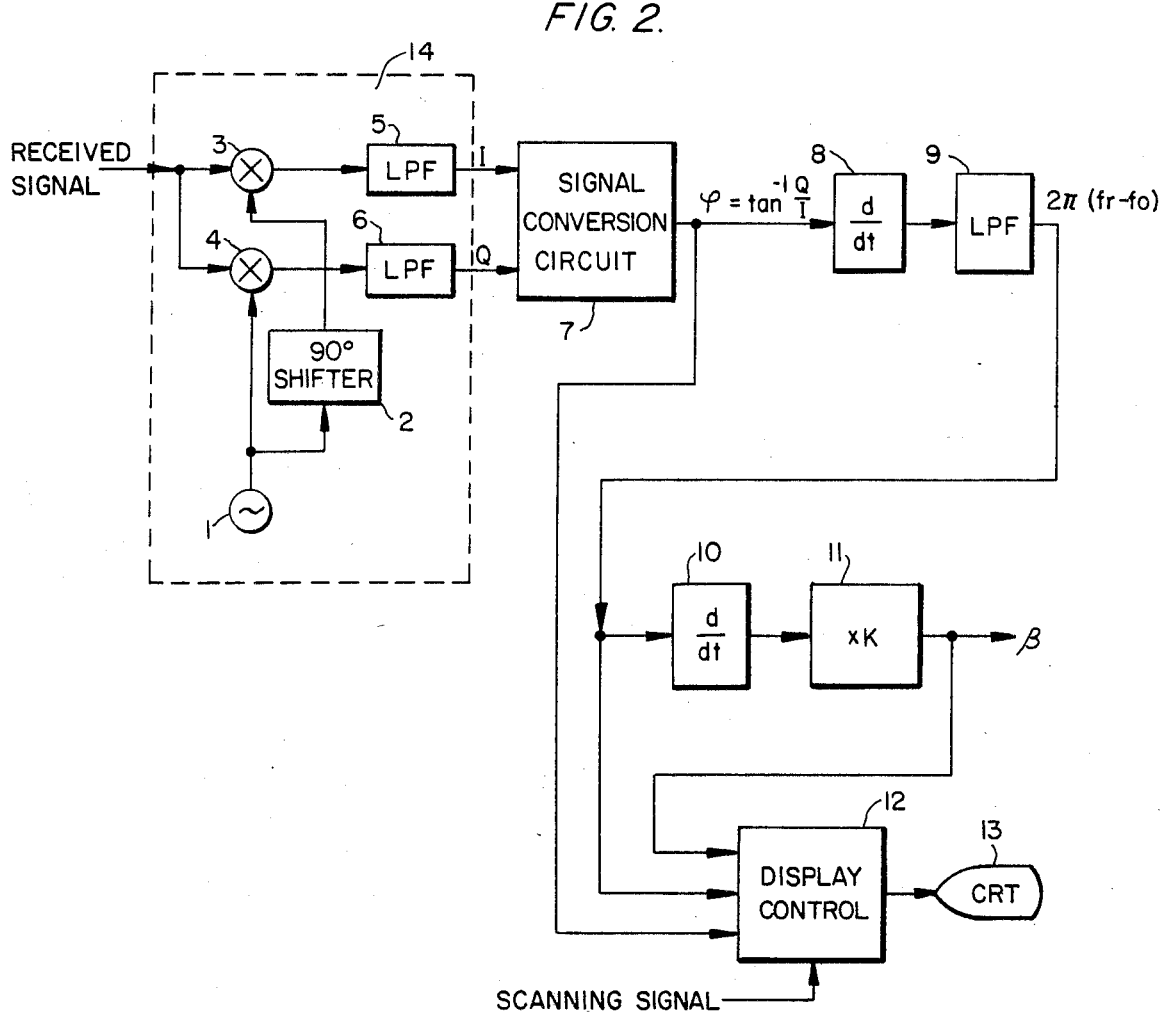
FIG. 2 is a block diagram of a first embodiment of the present invention.

FIG. 2 is a block diagram of a first embodiment of the present invention wherein a signal is transmitted from one or more transducers into a medium under examination. A received signal, reflected by the medium, is input to a quadrature detector circuit 14 which includes a reference signal oscillator 1 with an oscillation frequency of $\pi$, a 90° phase shifter 2, analog multipliers 3 and 4, and low-pass filters 5 and 6. The reflected signal, having been received and amplified, is input, as the received signal, to the quadrature detector 14 from which the in-phase component I and quadrature component Q are obtained. For example, if the reference signal is 2 cos $2\pi\nu t$ and the received signal has a frequency spectrum between $f_e$ and $f_u$, then the output of the multipliers 3 and 4 will have two frequency bands ($f_e - \nu$) to ($f_u - \nu$) and ($f_e + \nu$) to ($f_u + \nu$). The low-pass filters 5 and 6 reject the higher of these two frequency bands. The components I and Q are input to the signal conversion circuit 7 and $\phi = \tan^{-1}(Q/I)$ is output. The output of $\phi = \tan^{-1}(Q/I)$ obtained in the signal conversion circuit 7 is differentiated by a differentiating circuit 8 and is then smoothed by a low-pass filter 9.

Figure 3A:
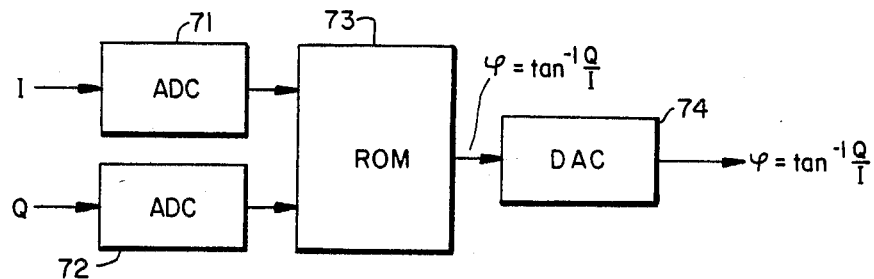
FIG. 3A is a block diagram of a first embodiment of the signal conversion circuit 7 in FIG. 2.

A first embodiment of the structure of the signal conversion circuit 7 is illustrated in FIG. 3A, in which components I and Q are converted from analog signals to digital signals in analog/digital converters 71 and 72 and then input to a conversion table ROM 73 to determine $\tan^{-1}(Q/I)$. The value read out for $\tan^{-1}(Q/I)$ is converted to an analog signal in a digital/analog converter 74 and is then output as the phase $\phi$.

Figure 3B:
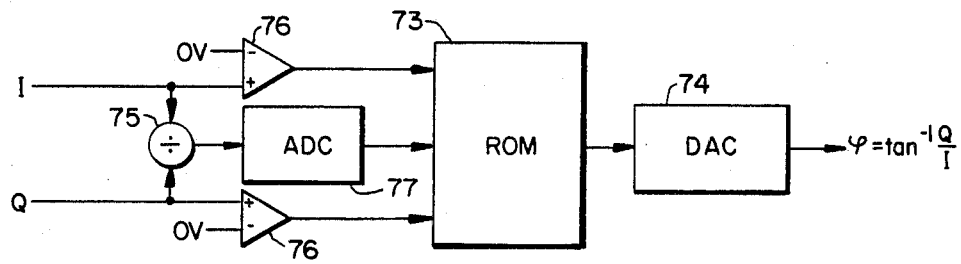
FIG. 3B is a block diagram of a second embodiment of the signal conversion circuit 7 in FIG. 2.

FIG. 3B is a second embodiment of the signal conversion circuit 7. As shown in FIG. 3B, it is also possible to obtain the value of the phase $\phi$ by dividing Q/I in an analog divider 75 and inputting it to the ROM 73 after converting Q/I to a digital signal in an analog/digital converter 77. The signs of I and Q, which specify the quadrant of the phase $\phi$ are determined by voltage comparators 76 and 78 and are input to the ROM 73 along with the digital Q/I signal. This method offers advantages in that only one A/D converter is required and the table in the ROM 73 may be smaller without losing accuracy.

Figure 7A:
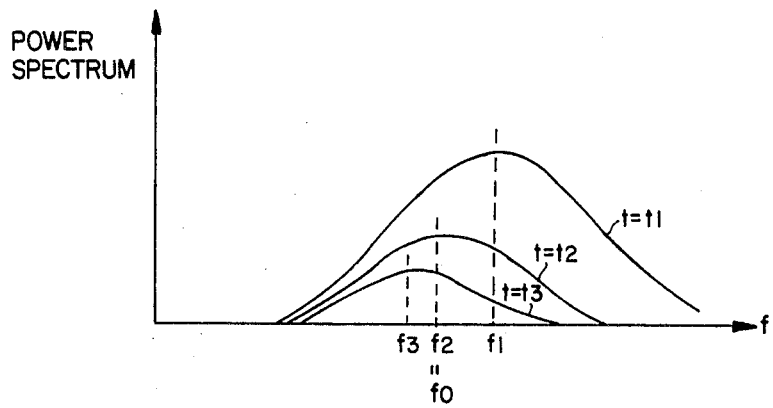
FIG. 7A is a graph of the power spectrum of the received signal.
Figure 7B:
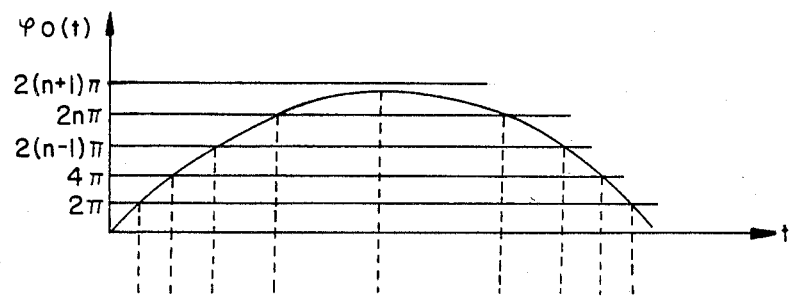
FIG. 7B and 7C are graphs of phase $\phi$ versus time.
Figure 7C:
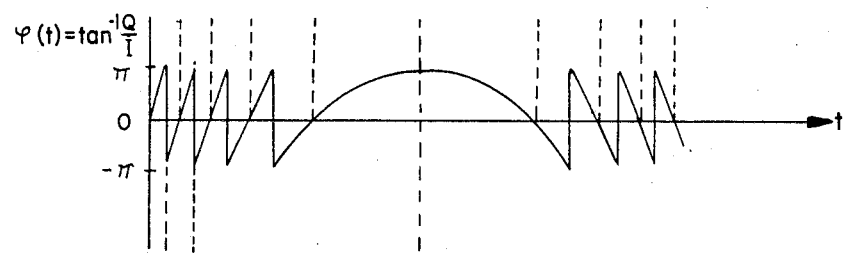
Figure 7D:
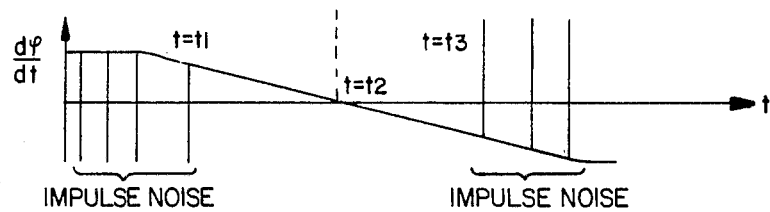
FIG. 7D is a graph of d$\phi$/dt versus time.

FIGS. 7A-7D are graphs illustrating the process of obtaining respective signals until the center frequency shift $\Delta f = f_r - \nu$ is obtained. FIG. 7A is a graph of the power spectrum of the received signal. As time passes, $t = t_1, t_2, t_3, \ldots$, the ultrasonic wave is reflected from deeper areas, high frequency components are attenuated and the center frequency shifts to lower frequencies $f_2$ and $f_3$. FIGS. 7B–7D are profiles of the phase difference $\phi_o(t)$ and $d\phi(t)/dt$ which are obtained from $\phi(t) = \tan^{-1}(Q/I)$ when the reference frequency $\nu$ of the reference signal oscillator 1 is used as $f_2$. As can be easily estimated from equation (9) and as is illustrated in FIG. 7B, $\phi_o(t)$ increases continuously while the center frequency $f_r$ of the received spectrum is higher than $\nu$ (in the period where $t < t_2$), does not change when the center frequency $f_r$ is equal to the reference frequency $\nu$ (when $t = t_2$) and continuously decreases when the center frequency $f_r$ is lower than the reference frequency $\nu$ (in the period where $t > t_2$). The table in the ROM 73 gives values of $\phi(t) = \tan^{-1}(Q/I)$ within the range of $-\pi \leq \phi(t) \leq \pi$, so the values of $\phi(t)$ output by the signal conversion circuit 7 are as depicted in FIG. 7C. Therefore, $d\phi(t)/dt$, as depicted in FIG. 7D, includes impulse noise during the periods that $\phi(t)$ changes in value from $\pi$ to $-\pi$ (a change known as wrap around). The low-pass filter 9 in FIG. 2 is provided to eliminate such noise.

Figure 9:
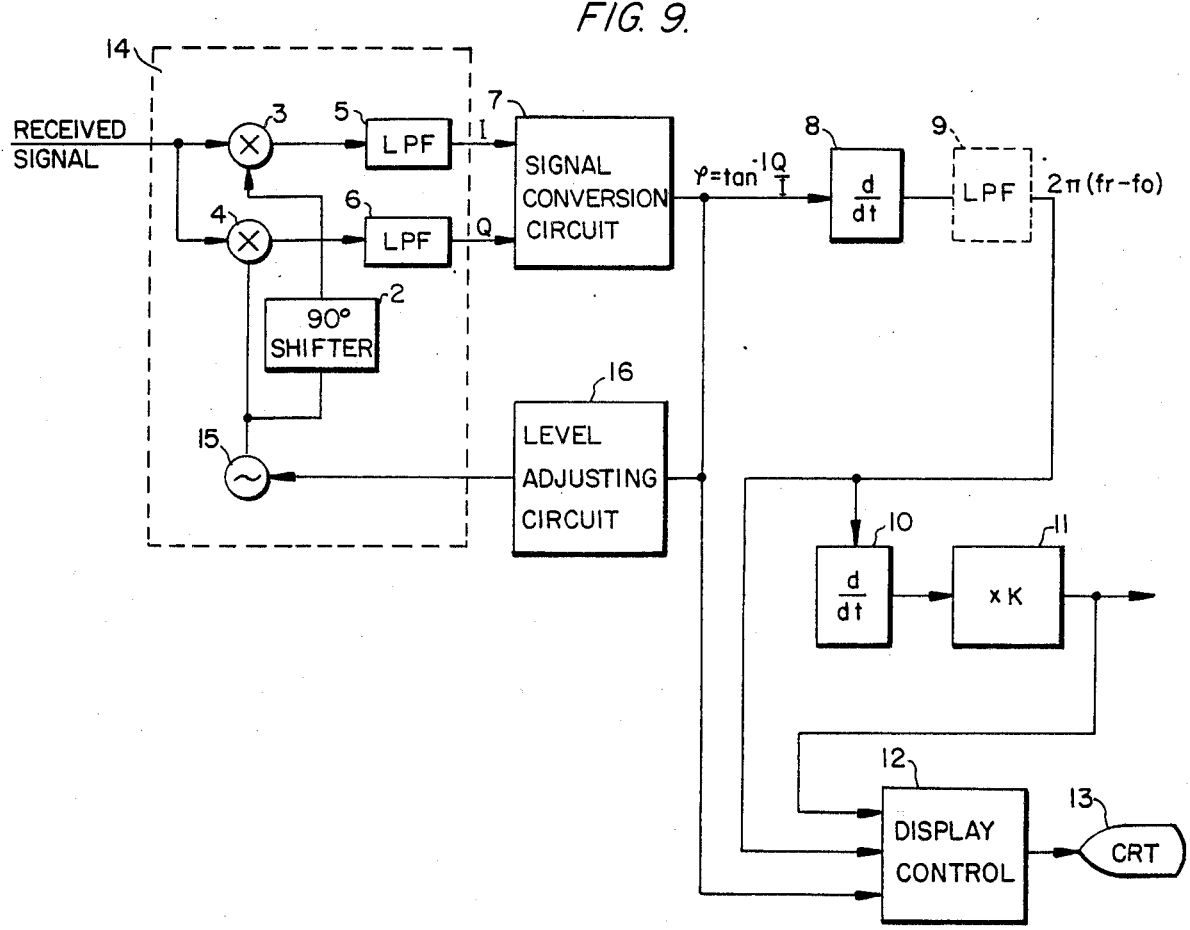
FIG. 9 is a block diagram of a second embodiment of the present invention.

When the difference $\Delta f$ between the reference frequency $\nu$ and the received frequency $f_r$ is large, $\phi_o(t)$ indicates a $2\pi$ change of phase within a very short period of time and, as a result, the impulse noise in the $d\phi(t)/dt$ signal increases considerably and can no longer be easily removed. A feedback loop that changes the reference frequency $\nu$ to be almost equal to the received frequency $f_r$ solves this problem so that $\phi(t)$ changes gradually. A second embodiment of the present invention using such a feedback loop is illustrated in FIG. 9. In FIG. 9, the elements which are the same as those in FIG. 2 are given the same reference numerals and no further explanation of these elements is necessary. The only difference between the FIG. 9 circuit and the circuit of FIG. 2 is that the reference signal oscillator 1 is replaced by a variable frequency voltage controlled oscillator 15 for producing a reference frequency $\nu$ controlled by the signal from a level adjusting circuit 16 which depends on the output ($\phi = \tan^{-1}(Q/I)$) of the differentiating circuit 8. The reference frequency $\nu$ is controlled through the feedback loop so that the reference frequency $\nu$ is raised when $\phi(t)$ is increasing, and lowered when $\phi(t)$ is decreasing. Therefore, even if the center frequency (or average frequency) $f_r$ of the received signal drops, the reference frequency $\nu$ from the oscillator 15 also drops and $f_r - \nu$ is kept almost constant, so that wrap around will rarely occur because excessive changes in $\phi(t)$ are prevented. If wrap around is completely removed, the low-pass filter 9 is not needed.

Alternatively, other hardware or software could be used to generate values for $\phi(t)$ similar to those depicted in FIG. 7B. A block diagram of an alternate embodiment of the present invention utilizing software would look the same as FIG. 9, with the level adjusting circuit 16 comprising a microprocessor programmed to adjust the level of the input voltage of the variable oscillator 15.

Other modifications to the above embodiments are also possible. The center frequency shift $\Delta f$ can be obtained without first finding the phase difference $\phi_o(t)$ as in the fourth embodiment illustrated in FIG. 12 and described below, in which the center frequency shift $\Delta f$ is obtained from the moments of the power spectrum calculated in the time domain. Also, a method, which can be applied to the present invention, for removing wrap around using software is described in J. M. Tribolet, "A New Phase Unwrapping Algorithm", *IEEE TRANSACTIONS ON ACOUSTICS, SPEECH AND SIGNAL PROCESSING*, VOL. ASSP-25, NO. 2, APRIL 1977, pp. 170–177.

As explained above, the output of the low-pass filter 9 of FIG. 2 $[d\phi(t)/dt]_{LPF}$ is proportional to the center frequency shift $\Delta f$. The attenuation slope coefficient $\beta$ in equation (5) can be obtained from the output $[d\phi(t)/dt]_{LPF}$ by dividing $[d\phi(t)/dt]_{LPF}$ by $-8\pi\sigma^2$ and differentiating it with respect to the distance $z$. But since $z = C_t/2$ (where C is the velocity of sound in the medium being studied and is assumed constant for applications of this invention and t is the time since sending the ultrasonic wave), differentiation with respect to $z$ can be replaced by differentiation with respect to time $t$ in the differentiating circuit 10 of FIG. 2. The attenuation slope coefficient $\beta(z)$ can be obtained by multiplying by a constant $K = -1/(4\pi C\sigma^2)$ in the amplifier 11 after differentiation.

In the above explanation, the spectrum of the received signal is assumed to have a Gaussian distribution, just like the spectrum of the transmitted signal. Even if the received signal does not have a Gaussian distribution, since the average frequency shift is obtained by differentiating $\tan^{-1}(Q/I)$ with respect to time $t$, an approximate value of the attenuation slope coefficient $\beta$ will be obtained through the operations explained above. Also, $\tan^{-1}(Q/I)$ was obtained above as an analog signal and the differentiation and low-pass filtering were carried out on analog signals, but it is of course possible to use the output of the ROM 73 as a digital signal and then perform succeeding steps using digital circuitry.

Figure 8:
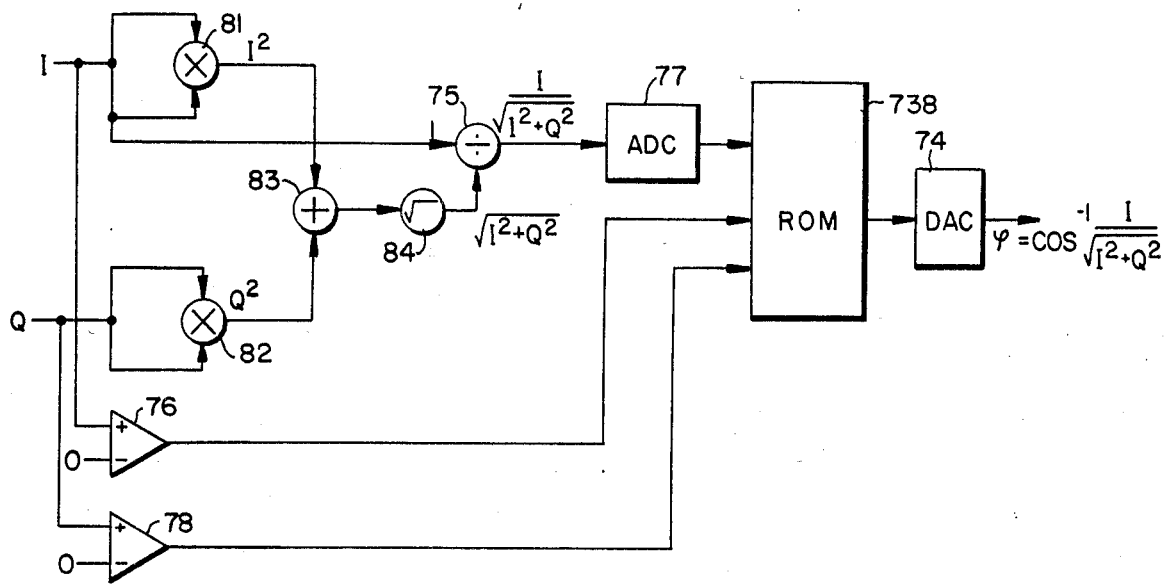
FIG. 8 is a block diagram of a third embodiment of the signal conversion circuit 7 in FIG. 2.

In the first and second embodiments of the present invention, the phase $\phi$ may be obtained using $\cos^{-1}$ or $\sin^{-1}$ in place of $\tan^{-1}$. A circuit which can be used as the signal conversion circuit 7 in FIG. 2 for finding $\phi = \cos^{-1}(I/\sqrt{I^2+Q^2})$ is illustrated in FIG. 8. The operation and purpose of the comparators 76 and 78, the divider 75, A/D converter 77, and D/A converter 74 in FIG. 8 are similar to the elements in FIG. 3B having the same reference numerals. The comparators 76 and 78 in FIG. 8 aid in distinguishing $0 \leq \phi \leq \pi$ from $\pi \leq \phi \leq 2\pi$. The difference between ROM 738 and ROM 73 is in the contents of the stored table. In FIG. 8, multipliers 81 and 82 form the square of components I and Q, respectively. An adder 83 sums the squares and root generating circuit 84 generates the divisor $(\sqrt{I^2+Q^2})$ for the divider 75. The square root generating circuit 84 as well as the multipliers 3, 4, 81 and 82 and divider 75 can all be implemented using an MC1595L multiplier manufactured by Motorola, and, as needed, an operational amplifier.

Figure 4:
FIG. 4 is a symbolic diagram of an EXCLUSIVE OR gate.
Figure 5:
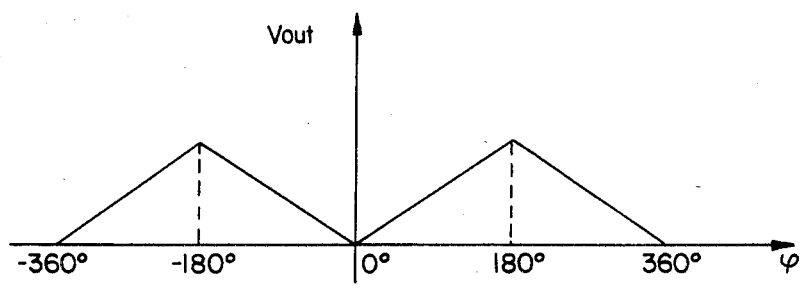
FIG. 5 is a graph of the relationship between phase $\phi$ and the mean voltage Vout output by an EXCLUSIVE OR gate.

In the first and second embodiments of the present invention calculations such as $\tan^{-1}$ and $\cos^{-1}$ may be omitted by employing a phase comparator which generates an output proportional to a phase difference. For example, as is well known, when a pair of square waves INPUT 1 and INPUT 2 are input to an EXCLUSIVE OR circuit as illustrated in FIG. 4, the mean value Vout of the output OUTPUT is proportional to the phase difference $\phi$ between the two square waves INPUT 1 and INPUT 2. The relation between $\phi$ and Vout becomes linear as shown in FIG. 5 and a value of $\phi = K'V\text{out}$ (where $K'$ is a proportional constant) can be directly obtained without executing calculations of $\tan^{-1}$ and $\cos^{-1}$. However, as can be seen in FIG. 5, the same value of Vout is obtained for positive and negative values of $\phi$ and these values of $\phi$ cannot be distinguished when only two signals are used.

Figure 6A:
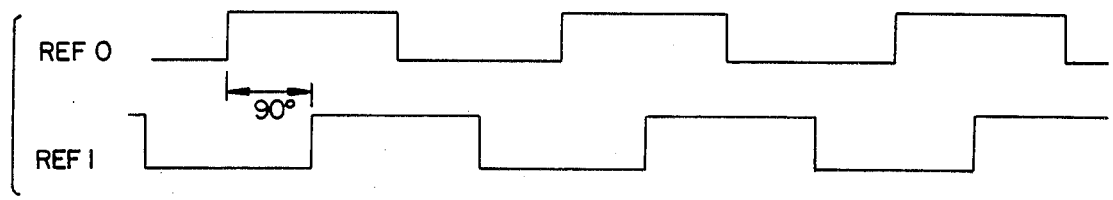
FIG. 6A is a graph of reference signals REF0 and REF1.
Figure 6B:
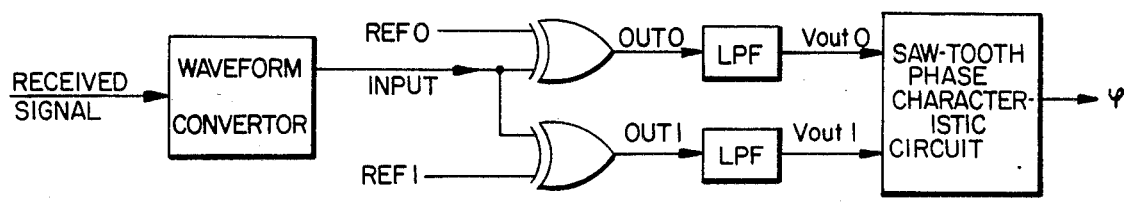
FIG. 6B is a symbolic diagram of the EXCLUSIVE ORing of an input signal INPUT with reference signals REF0 and REF1.
Figure 6C:
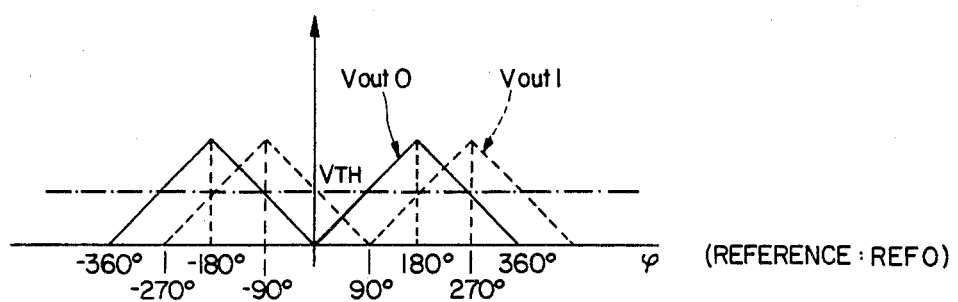
FIG. 6C is a graph of the relationship of the phase $\phi$ of the input signal to Vout0 and Vout1.

To solve this problem, square waves REF0 and REF1, having a phase difference of 90° (as illustrated in FIG. 6A), are used as reference signals. The received signal is converted into a square wave INPUT by a waveform converter 60 which may comprise an amplifier and a level slicer (not shown). The converted received signal is input to EXCLUSIVE ORs (61 and 62) along with each of the reference signals (REF0 and REF1, respectively) as illustrated in FIG. 6B. Low pass filters 63 and 64 are then used to generate mean values Vout0 and Vout1 from the outputs OUT0 and OUT1, respectively. The relationship between the phase $\phi$ of the converted received signal INPUT and Vout0 and Vout1 is the sawtooth phase characteristic which is illustrated in FIG. 6C and stored in the saw-tooth phase characteristic circuit 65, therefore:

Vout1 $\leq V_{TH}$ when $\phi \geq 0$

Vout1 $> V_{TH}$ when $\phi < 0$ for $-180° \leq \phi \leq 180°$. From the above relationship, the sign (positive or negative) of the phase $\phi$ can be determined. It is obvious that the absolute value of the phase $|\phi|$ can be easily obtained from $|\phi| = K'\text{Vout0}$ and therefore the phase $\phi$ itself can be obtained easily in the saw-tooth phase characteristic circuit 65 without the complicated calculations required for finding the $\tan^{-1}$ and $\cos^{-1}$ functions.

In the first and second embodiments of the present invention, the phase difference $\phi$ between the received signal and the reference signal may be obtained by sampling the received signal at a frequency of several MHz after direct A/D conversion and by finding the phase difference $\Phi$ by digital processing of the sampled data using software or hardware. An example of a structure using digital processing is a combination of a high speed waveform sampling system and a computer.

While the first and second embodiments of the present invention remove the effects of frequency independent reflection, spectrum scalloping remains in the received signal. The third through fifth embodiments of the present invention, illustrated in FIGS. 10, 12 and 15, respectively, are directed at removing effects of spectrum scalloping. The theory behind these three embodiments will now be developed. Japanese Patent Application No. 58-45396 discloses a method of processing in the frequency domain for removing effects of spectrum scalloping. In this frequency domain method, a time-gated window of width T is used to obtain the power spectrum $|P(f)|^2$ by a Fourier transformation of the time-gated received signal. In the frequency domain, the average frequency $\bar{f}$ can be defined by equation (11):

$$\bar{f} = \frac{\int f \cdot |P(f)|^2 df}{\int |P(f)|^2 df} \tag{11}$$

The moments of the power spectrum can therefore be found in the frequency domain as indicated in equations (12) and (13):

$$M_0 = \int |P(f)|^2 df \tag{12}$$

$$M_1 = \int f |P(f)|^2 df \tag{13}$$

This leads to the following equation (14) for average frequency:

$$\bar{f} = \frac{M_1}{M_0} \tag{14}$$

The average frequency $\bar{f}$ and power spectrum moments $M_0$, $M_1$, etc., can be calculated by circuits in the third through fifth embodiments because of relationships between values in the time and frequency domains. For example, the power spectrum, center frequency and moments are theoretically related to time-domain values such as the in-phase and quadrature components I and Q and the autocorrelaton function $R(\tau)$ and its first and second derivatives $\dot{R}(\tau)$, $\ddot{R}(\tau)$. The following equations (15) through (17) define the autocorrelation function of the power spectrum:

$$R(\tau) = \int |P(f)|^2 e^{j2\pi f \tau} df \tag{15}$$

$$\dot{R}(\tau) = 2\pi j \int f |P(f)|^2 e^{j2\pi f \tau} df, \ \left( \dot{R}(\tau) = \frac{\partial R}{\partial \tau} \right) \tag{16}$$

$$\ddot{R}(\tau) = (2\pi j)^2 \int f^2 |P(f)|^2 e^{j2\pi f \tau} df, \ \left( \ddot{R}(\tau) = \frac{\partial^2 R}{\partial \tau^2} \right). \tag{17}$$

Solving equation (15)–(17) for $\tau = 0$, the following equations (18) to (20) result:

$$R_{(o)} = \int |P(f)|^2 df = M_0 \tag{18}$$

$$\dot{R}_{(o)} = 2\pi j \int f |P(f)|^2 df = 2\pi j M_1 \tag{19}$$

$$\ddot{R}_{(o)} = (2\pi j)^2 \int f^2 |P(f)|^2 df = (2\pi j)^2 M_2 \tag{20}$$

Defining the moments $M_0$ and $M_1$ in equation (12) in terms of $R_{(o)}$ and $\dot{R}_{(o)}$ results in equation (21):

$$\bar{f} = \frac{M_1}{M_0} = \frac{1}{2\pi j} \frac{\dot{R}_{(0)}}{R_{(0)}} \tag{21}$$

Equations (22) to (27-2) can be derived from equations (18)–(21) and known formulas, where $<>$ indicates averaging over time window T:

$$\sigma^2 = \frac{M_2}{M_0} - \left( \frac{M_1}{M_0} \right)^2 = \tag{22}$$

$$\frac{1}{(2\pi j)^2} \frac{\ddot{R}_{(0)}}{R_{(0)}} - \left( \frac{1}{(2\pi j)} \frac{\dot{R}_{(0)}}{R_{(0)}} \right)^2$$

$$M_0 = <I^2 + Q^2> \tag{23}$$

$$M_1 = \tfrac{1}{2} <\dot{Q}I - Q\dot{I}> + \nu M_0 \tag{24}$$

$$M_2 = \frac{1}{(2\pi)^2} <\dot{I}^2 + \dot{Q}^2> + 2\nu M_1 - \nu^2 M_0 \tag{25}$$

$$\bar{f} = \frac{M_1}{M_0} = \frac{1}{2\pi} \frac{d}{dt}\left(\tan^{-1}\frac{Q}{I}\right) + \quad (26)$$

$$v = (\tfrac{1}{2})\frac{<\dot{Q}I - Q\dot{I}>}{<I^2 + Q^2>} + v$$

$$\sigma^2 = \frac{M_2}{M_0} - \left(\frac{M_1}{M_0}\right)^2 \quad (27\text{-}1)$$

$$\frac{1}{(2\pi)^2}\frac{<\dot{I}^2 + \dot{Q}^2>}{<I^2 + Q^2>} - \left(\frac{<\dot{Q}I - Q\dot{I}>}{<I^2 + Q^2>}\right)^2 \quad (27\text{-}2)$$

As indicated by Equations 21, 22, 26 and 27, the average frequency $\bar{f}$ and the variance $\sigma^2$ in the frequency domain can be obtained from the autocorrelation function using the quadrature detector outputs which are calculated in the time domain, thus avoiding Fourier transformation into the frequency domain.

The third embodiment of the present invention uses the first derivative $\dot{\phi}$ of the phase difference $\phi$ which may be obtained by differentiating the phase difference $\phi$ output by any of the circuits used in the first and second embodiments, or it may be obtained from the following equation (28):

$$\dot{\phi} = \frac{\dot{Q}I - I\dot{Q}}{I^2 + Q^2} \quad (28)$$

If $\dot{\phi}$ is time-averaged over a sufficiently long time period T, the average phase difference $<\dot{\phi}>$ in the time domain has the following relationship, indicated in equation (29), with $\bar{f}$ and $\nu$ in the frequency domain:

$$<\dot{\phi}> = 2\pi\bar{f} - 2\pi\nu \quad (29)$$

For short time periods T, the average of the first derivative of the phase difference $<\dot{\phi}>$ has a variance caused by spectrum scalloping. If $\bar{f}$ is the average frequency of a frequency spectrum not subjected to spectrum scalloping, equation (30) would be applicable:

$$T<\dot{\phi}> = 2\pi\bar{f} - 2\pi\nu + <\dot{\phi}_r> \quad (30)$$

where $\dot{\phi}_r$ is random phase and $\dot{\phi}_R/2\pi$ is random instantaneous frequency, caused by the spectrum scalloping. If the spectrum of the received signal is again assumed to have a Gaussian distribution and it is assumed that the attenuation slope coefficient $\beta$ is linearly dependent on frequency, then the following equations are given by Kuc, R. et al., "Parametric Estimation of the Acoustic Attenuation Coefficient Slope for Soft Liver", IEEE, 1976, *Ultrasonic Symposium Proceedings*, pps. 44–47:

$$\bar{f}_{(z)} = \bar{f}_{(o)} - B_{(z)} \quad (31)$$

$$B_{(z)} = 4\sigma^2 \int_o^z \beta(z) dz \quad (32)$$

$$t = \int_o^z \frac{2dz}{C_{(z)}} = \frac{2z}{C} \quad (33)$$

where z is the depth along the scan line from the surface and the transducer is located at the body surface, hence $z = 0$, t is the round-trip time to the depth z, $\sigma$ is the standard deviation of the Gaussian spectrum, and C is the sound velocity which is assumed constant for all kinds of tissue. The scan line is the line along which the pulse is transmitted and along which the echoes comprising the received signal return. Defining $\bar{f}$ in equation (30) in terms of equations (31) and (32), the following equation (34) results:

$$<\dot{\phi}_{(z)}> = 2\pi(\bar{f}_{(o)} - 4\sigma^2 \int \beta_{(z)} dz) - 2\pi\nu + <\dot{\phi}_r> \quad (34)$$

Since distance z depends on time t, z can be replaced with t in equation (34) and if both sides are differentiated with respect to time, equation (35) results:

$$\frac{\partial}{\partial t} <\dot{\phi}> = 4\pi\sigma^2 C\beta_{(t)} + \frac{\partial}{\partial t} <\dot{\phi}_r> \quad (35)$$

Therefore, if $\delta/\delta t <\dot{\phi}_r>$ can be reduced to zero for the short time period T, then the attenuation slope coefficient $\beta$ can be determined from equation (35). In a manner similar to that used by the prior art in the frequency domain, $\delta/\delta t <\dot{\phi}_r>$ could be reduced by averaging around a point of interest. However, this reduces the spatial resolution and requires a large amount of processing, thereby making real-time operation difficult.

An apparatus according to one of the third through fifth embodiments of the present invention uses "centroid averaging" in real time to eliminate $\delta/\delta t <\dot{\phi}_r>$ without spatial averaging, thereby assuring high spatial resolution and high accuracy using lowcost, simple circuitry having easy operation. The received signal is a convolution of a desired pulse waveform and a random signal described above. Thus, the random phase $\phi_r$ is included in, e.g., the output from quadrature detectors 14-1 to 14-m (FIG. 10) which process the received signal. The random phase $\phi_r$ varies with the center frequency $f_r$. Thus, by averaging signal characteristics for several frequency bands of the received signal, each having a different center frequency $(f_r)_i$, $\delta/\delta t <\dot{\phi}_r>$ will be reduced and the attenuation slope coefficient $\beta$ can be obtained. If the standard deviations $\sigma_i$ for each of the received signal bands are the same, equation (35) becomes:

$$\frac{\partial}{\partial t} <\dot{\phi}> = 4\pi\sigma^2 C\beta_{(t)} \quad (36)$$

The signal characteristic which is averaged can be any of the quantities such as $\dot{\phi}$, $\bar{f}$ and $\beta$ which were derived from the outputs of the single quadrature detector 14 in the first and second embodiments. In the third embodiment of the present invention, illustrated in FIG. 10, m filters 17-1 to 17-m distribute the received signal into m received signal bands and then m corresponding quadrature detectors 14-1 to 14-m generate in-phase and quadrature components for each of the received signal bands. Prior to averaging in an averaging circuit 18, m signal conversion circuits 7-1 to 7-m generate the phase difference $\phi$ by one of the methods described in the first two embodiments. The output of the averaging circuit 18 is the average phase difference $<\phi>$ and differentiating circuits 8 and 10 output $<\dot{\phi}_r>$ and $\beta$, respectively.

Figure 10:
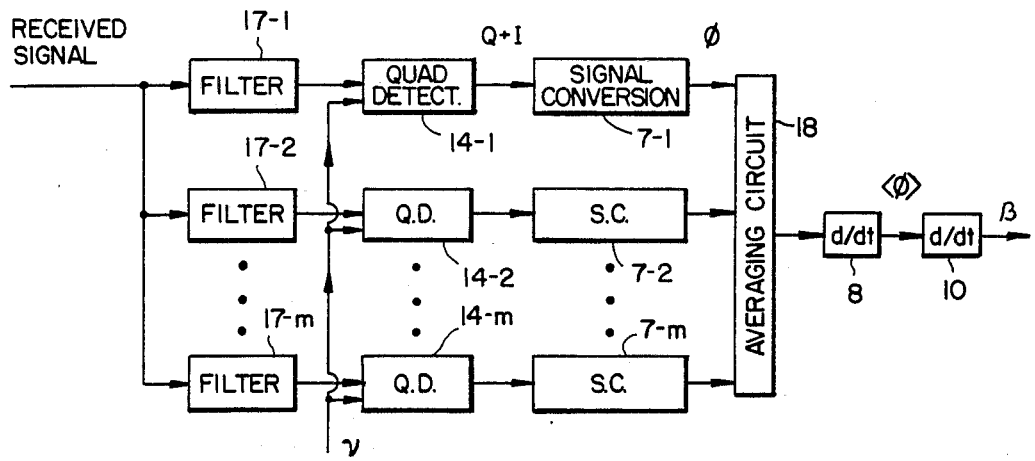
FIG. 10 is a block diagram of a third embodiment of the present invention having multiple phase detectors and an averaging circuit to remove the effects of spectrum scalloping.
Figure 11:
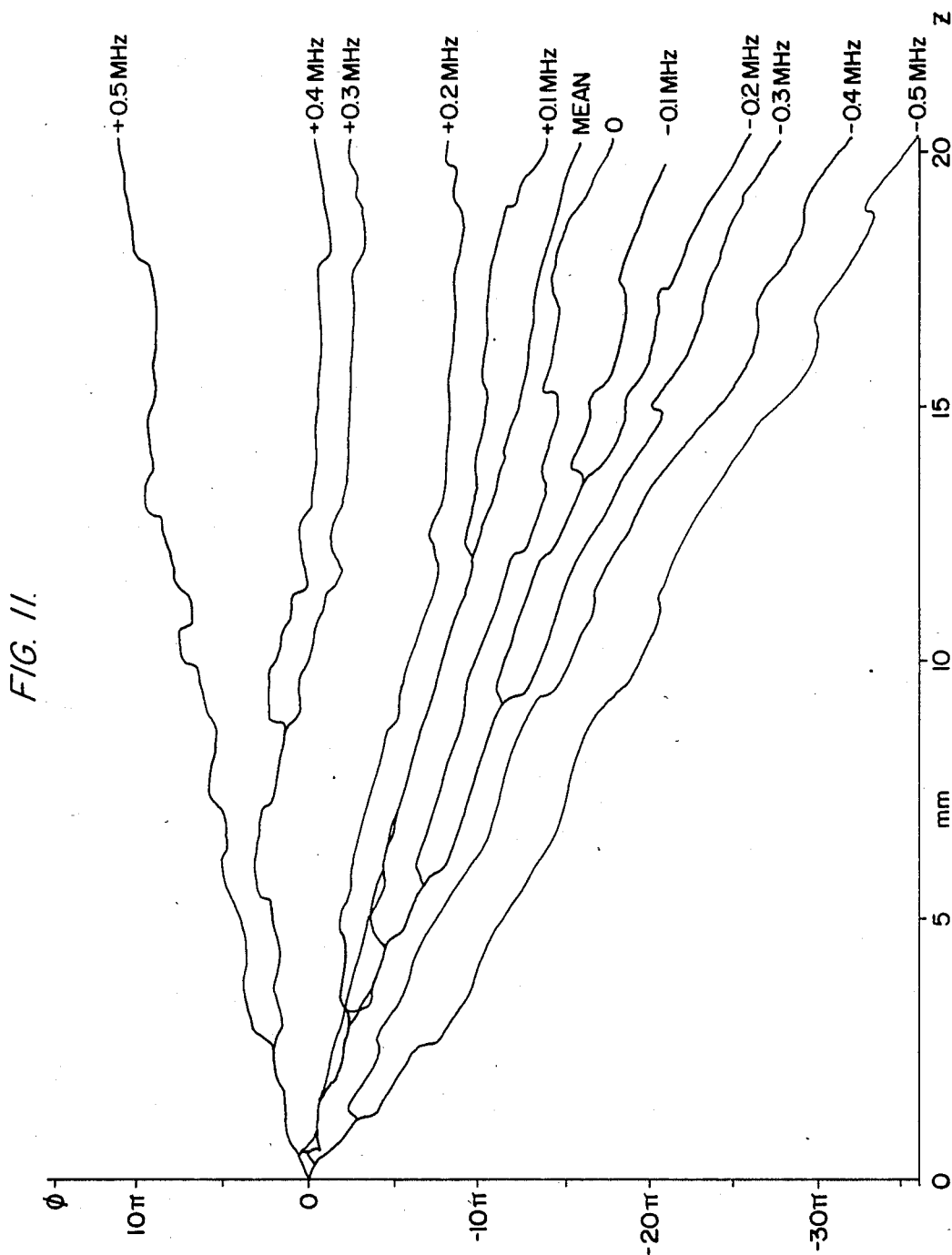
FIG. 11 is a graph of the phase difference versus the depth of the reflection for a device according to the third embodiment of the present invention having 11 frequency bands or channels.

As a test of the effectiveness of the present invention, the embodiment illustrated in FIG. 10 was used on a rabbit liver about 2 cm thick. A 4.0 MHz disc transducer with a bandwidth of almost 1 MHz supplied the transmitted signal and the received signal was distributed by 11 filters each having a bandwidth of 0.66 MHz and center frequencies separated by 0.1 MHz. The signal conversion circuits 7-1 to 7-11 used an arctangent calculator which included an unwrapping algorithm. The averaging circuit 18 provided an arithmetic average $<\phi>$ of the phase difference $\phi$ and the differentiating circuit 10 included dividing the result of the differentiation by $4\pi\sigma^2 C$ and thus output the attenuation slope coefficient $\beta$. The output of the signal conversion circuits 7-1 to 7-11 and the averaging circuit 18 are illustrated in FIG. 11 with "mean" referring to the average phase difference $<\phi>$ output by the averaging circuit 18. From FIG. 11, it is clear that the random phase component of $<\phi>$ is remarkably reduced.

Figure 12:
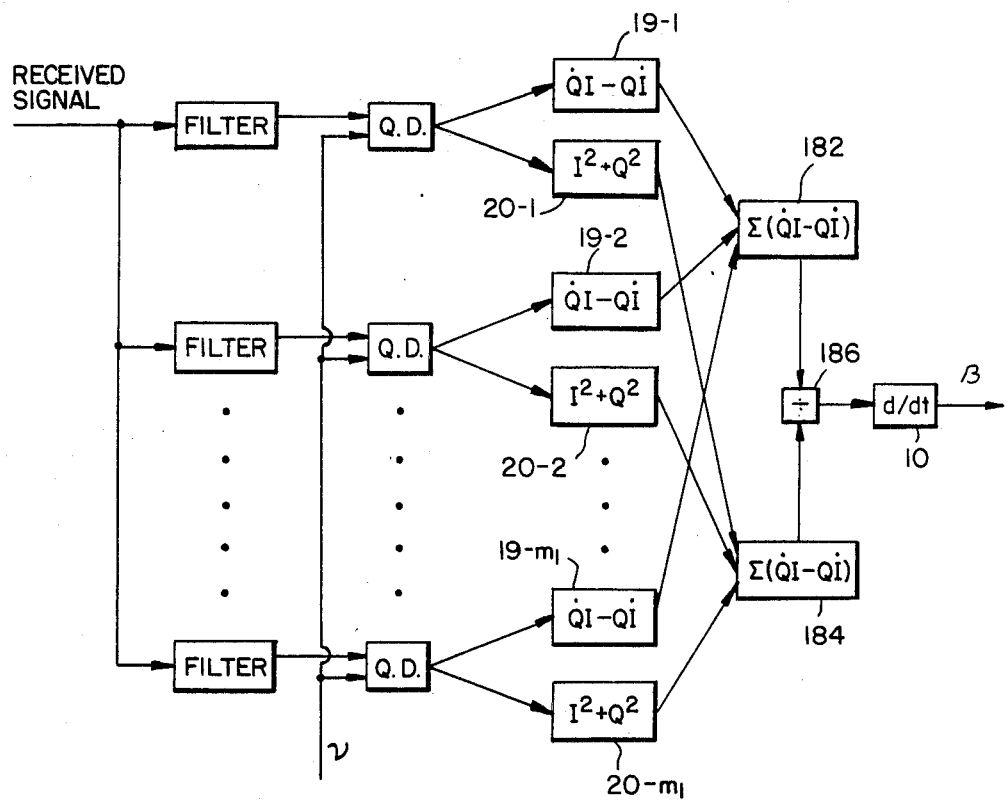
FIG. 12 is a block diagram of a fourth embodiment of the present invention in which the average frequency is obtained without first finding the phase difference.

A fourth embodiment of the present invention is illustrated in FIG. 12 in which $<\dot\phi>$ is calculated using equation (28) which was derived from the autocorrelation function. The signal conversion circuits 7-1 to 7-m, averaging circuit 18 and first differentiating circuit 8 are replaced with first calculation circuits 19-1 to 19-$m_1$ which calculate $(\dot{Q}I-Q\dot{I})$, second calculation circuits 20-1 to 20-$m_1$ which calculate $(I^2+Q^2)$, first and second summation circuits 182 and 184 which sum the output of the first 19-i and second 20-i calculation circuits, respectively, and a divider circuit 186. The remaining blocks in FIG. 12 contain the same components as in FIG. 10.

The number of received signal bands in FIG. 12 is indicated as $m_1$ because in the third embodiment, illustrated in FIG. 10, m filters provide m meaningful values which can be averaged for a specific depth $z$. However, in the fourth embodiment, illustrated in FIG. 12, as z increases, the center frequency $f_r$ and thus $<\dot\phi>$ decrease as indicated by equation (32). Additional received signal bands must be supplied to cover the decrease in the center frequency $f_r$ and $m_1$ is therefore larger than $m$.

The summation circuits 182 and 184 and divider circuit 186 average $\dot\phi$ and remove the random signal $\dot\phi_r$ by taking a weighted average using the moment $M_0=(I^2+Q^2)$ since some of the received signal bands will have minimal power. The weighted average $>\dot\phi_w>$ is given by equations (36) and (37).

$$<\dot\phi_w> = \frac{\sum_{i=1}^{m_1} <(\dot\phi_i)(I^2+Q^2)>_i}{\sum_{i=1}^{m_1} <(I^2+Q^2)_i>} = \quad (37\text{-}1)$$

$$\frac{\sum_{i=1}^{m_1} <\frac{(\dot{Q}I-Q\dot{I})}{(I^2+Q^2)_i}(I^2+Q^2)>}{\sum_{i=1}^{m_1} <(I^2+Q^2)>_i}$$

$$= \frac{\sum_{i=1}^{m_1} <(\dot{Q}I-Q\dot{I})>_i}{\sum_{i=1}^{m_1} <(I^2+Q^2)>_i} \quad (37\text{-}2)$$

Thus, the first calculation circuits 19-1 to 19-$m_1$ and summation circuit 182 provide the numerator of equation (37-2) and the second calculation circuits 20-1 to 20-$m_1$ and the second summation circuit 184 provide the denominator of equation (37-2), while the divider 186 outputs $<\dot\phi_w>$. When the output of the divider 186 is differentiated with respect to time and divided by the appropriate constant in the differentiation circuit 10, the attenuation slope coefficient $\beta$ is obtained.

The fourth embodiment avoids the calculation of the phase difference and the use of a phase unwrapping algorithm, thus simplifying the circuitry used in each of the components. However, since additional received signal frequency bands are required, a larger number of each of the components are needed. In the second embodiment, feedback control was implemented to eliminate the need for phase unwrapping. Similarly, in a fifth embodiment, illustrated in FIG. 13, feedback control is used to reduce the number of received signal bands needed to cover the decrease in $<\dot\phi>$ for increases in $z$.

Figure 13:
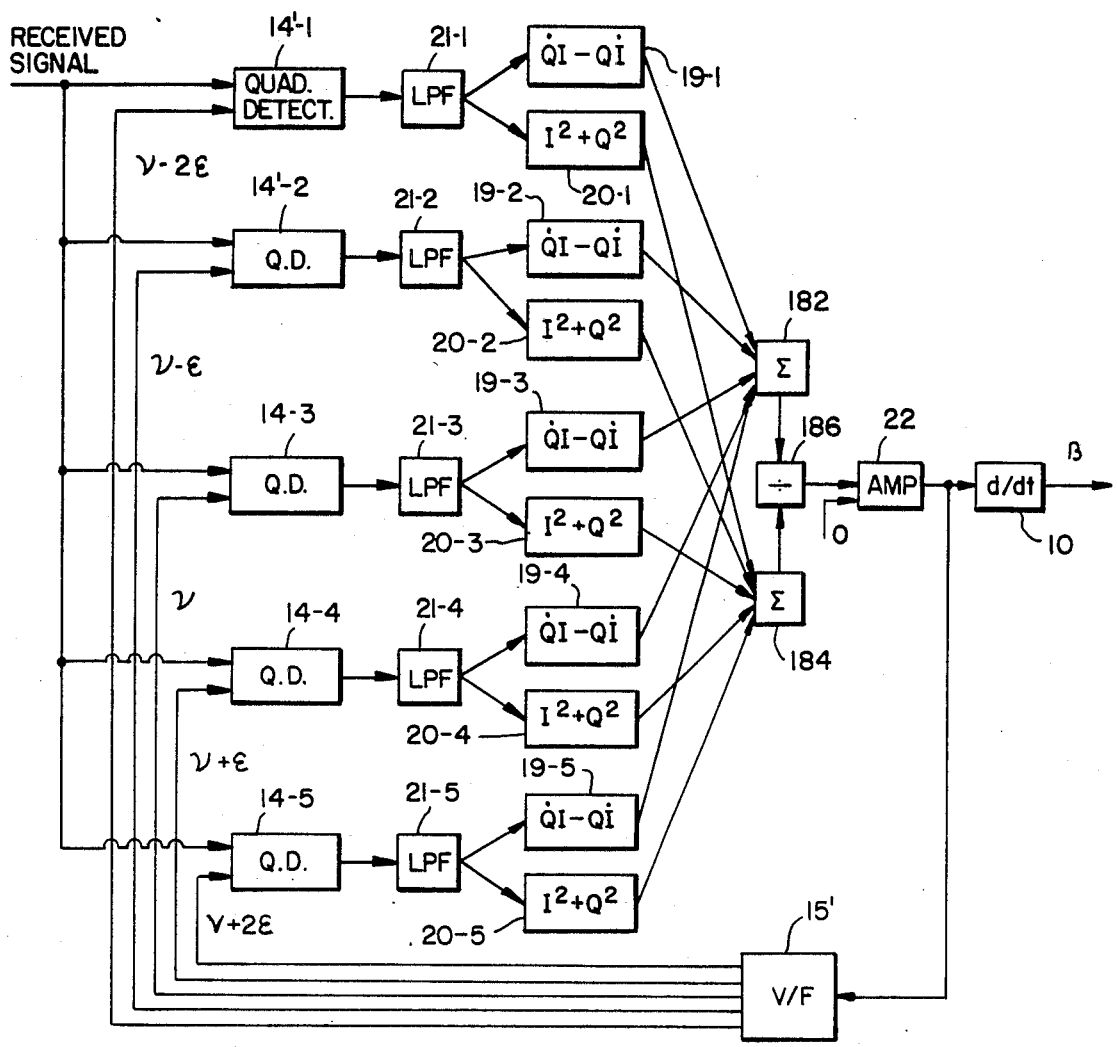
FIG. 13 is a block diagram of a fifth embodiment of the present invention in which multiple quadrature detectors and a feedback loop of the type used in the second embodiment are provided to remove the effects of spectrum scalloping.

In FIG. 13, the number of received signal bands is indicated as 5 to simplify the illustration, but in an actual device the number of bands would be m to provide the same resolution as the third embodiment. Distribution of the received signal is accomplished in the fifth embodiment by quadrature detectors 14'-1 to 14'-5, each of which receives a reference signal having a different frequency. The output of each of the quadrature detectors 14'-i passes through low-pass filters 21-1 to 21-5 which correspond to the low-pass filters 5 and 6 in FIG. 2. Calculation of $<\dot\phi>$ is completed by the divider 186, as in the fourth embodiment, and then a difference amplifier 22 compares the output of the divider 186 with zero and outputs the difference. The output of the difference amplifier 22 is supplied to the differentiation circuit 10, as in the third and fourth embodiments, and is also supplied to a voltage-to-frequency converter 15' which generates the reference signals for the quadrature detectors 14'-1 to 14'-5. As a result, the frequency band covered by the quadrature detectors 14'-1 to 14'-5 changes to follow the decrease in $<\dot\phi>$ and the same number of received signal bands may be used in the fifth embodiment as are used in the third embodiment.

Figure 14A:
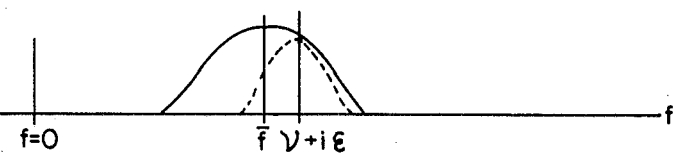
FIG. 14(A)-14(C) are graphs describing the operation of the fifth embodiment illustrated in FIG. 13.
Figure 14B:
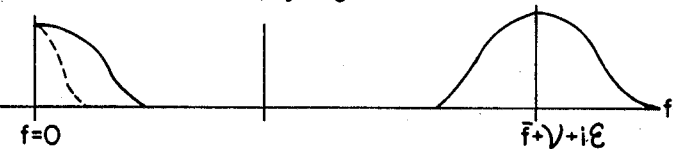
Figure 14C:
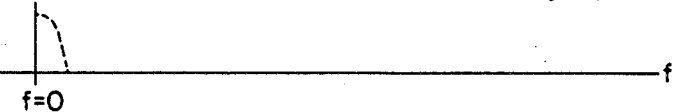

The operation of the fifth embodiment is illustrated in FIG. 14(A) through FIG. 14(C). The average frequency $\bar{f}$ and the reference frequency $\nu+i\epsilon$ (where i is an integer) for one of the quadrature detectors 14'-1 to 14'-5 are illustrated in FIG. 14(A). The received signal band corresponding to the illustrated quadrature detector 14'-i is illustrated as a dotted line, while the received signal is illustrated as a solid line. The output of the quadrature detector 14'-i includes high and low spectra as illustrated in FIG. 14(B). The high spectrum has the same profile as the received signal but has a higher center frequency, $\bar{f}+\nu+i\epsilon$, and the low spectrum is folded about the $f=0$ axis. The output waveform of the low-pass filter 21-i connected to the quadrature detector 14'-i is illustrated in FIG. 14(C). By using low-pass filters 21-1 to 21-5 with a high end cut-off frequency which is one-half the bandwidth of the filters 17-1 to 17-m or 17-$m_1$ of FIGS. 10 and 12, the output signals of m lowpass filters 21-1 to 21-m will have the same range as the quadrature detectors 14-1 to 14-m in the third embodiment. The calculation of $<\dot\phi>$ is performed in a manner similar to that in the fourth embodiment, e.g., the outputs of the first calculation circuits 19-1 to 19-5 are as follows:

$$[2\pi\bar{f}_{+2}-2\pi(\nu+2\epsilon)+<\dot\phi_{r,+2}>] \cdot (I_{+2}^2+Q_{+2}^2) \quad (38\text{-}1)$$

$$[2\pi\bar{f}_{+1}-2\pi(\sigma+\epsilon)+<\dot\phi_{r,+1}>](I_{+1}^2+Q_{+1}^2) \quad (38\text{-}2)$$

$$[2\pi\bar{f}_0-2\pi\nu+<\dot\phi_{r,0}>](I_0^2+Q_0^2) \quad (38\text{-}3)$$

$$[2\pi\bar{f}_{-1}-2\pi(\nu-\epsilon)+<\dot\phi_{r,-1}>](I_{+1}^2+Q_{-1}^2) \quad (38\text{-}4)$$

$$[2\pi\bar{f}_{-2} - 2\pi(\nu + 2\epsilon) + <\dot{\phi}_{r,-2}>](I_{-2}{}^2 + Q_{-2}{}^2) \quad (38\text{-}5)$$

where $\bar{f}_i$ is a center frequency and $<\dot{\phi}_{r,i}>$ is a random instanteous frequency in the ith received signal band. The sum $$\sum_{i=1}^{m_1} <\dot{\phi}_{r,i}>$$

tends to zero as the number of received signal bands m increases, while the weighted average of $(\bar{f}_r)_i$ tends to $\bar{f}_z$. Therefore, the output of the divider circuit 186 is proportional to the value given by equation (39).

$$2\pi\bar{f}_z - 2\pi\nu + 0 \quad (39)$$

The quantity in equation (39) is compared by the difference amplifier 22 which produces an output used by the differentiation circuit 10 and the voltage-to-frequency converter 15'. With a sufficiently high gain, the voltage-to-frequency converter 15' can supply reference signals to the quadrature detectors 14'-1 to 14'-5 to keep the output of the difference amplifier 22 almost exactly proportional to $\bar{f}_z$.

Many modifications of the fourth and fifth embodiments are possible. For example, Japanese Patent Application 58-142893 provides detail on the use of the autocorrelation function to calculate higher moments of the power spectrum, the variance $\sigma^2$ and other signal characteristics in the time domain which can be used for correcting the effect of frequency dependent reflection and to provide accurate tissue characteristics. These tissue characteristics can be derived from the statistical values generated by the calculation circuits 19-i, 20-i, 182, 184 and 186. As one example, the variance $\sigma^2$ is a good measure of the randomness of the tissue and can be used for medical diagnosis. As another example, the attenuation can be obtained as a function of depth z in the time domain from the attenuation slope coefficient $\beta$. The attenuation can be used for precise time-gain control to provide the reflection coefficient quantitatively for reflection coefficient imaging. This also leads to the measurement of frequency dependent reflection by a parameter such as the exponent of the frequency in the time domain.

An embodiment of the present invention includes an apparatus for supplying values such as $\phi$, $\Delta f$, $\bar{f},\beta$, $\sigma^2$, etc. to a CRT display 13 illustrated in FIGS. 2 and 9. By varying the scan line, a tomographic image of an object to be measured can be displayed and the above values can be simultaneously displayed using e.g., B-mode, M-mode, or Doppler images. For example, in FIGS. 2 and 9, $\phi$, $\Delta f$, $\bar{f}$ and $\beta$ are supplied to the display controller 12 as brightness signals. These signals are then supplied to the CRT 13 together with the pertinent synchronous signal, blanking signal and deflection signal related to the ultrasonic scanning of the object to be measured.

According to this invention, as explained above, the frequency shift $\Delta f$ of a reflected ultrasonic wave passing through a measuring medium and the attenuation slope coefficient $\beta$ of the ultrasonic wave in the measuring medium can be obtained on a real-time basis using a simple, low-cost circuit which is easy to use, in place of a relatively expensive and low speed device which obtains a power spectrum of the received signal. In addition, errors caused by pulse overlapping (spectrum scalloping) can be removed in the time domain, while maintaining high spatial resolution and real-time operation.

The many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for detecting characteristics of a medium using an ultrasonic wave pulse transmitted into the medium and received as a received signal after reflection by the medium, comprising:

signal distributing means, operatively connected to receive the received signal, for distributing the received signal into at least three received signal bands;

calculation means, operatively connected to said signal distributing means, for calculating a signal characteristic for each of the received signal bands from which a tissue characteristic can be derived;

averaging means, operatively connected to said calculation means, for averaging the signal characteristic of each of the received signal bands to produce an average signal characteristic; and tissue characteristic means, operatively connected to said averaging means, for outputting the tissue characteristic derived from the average signal characteristic.

2. An apparatus as recited in claim 1, wherein said signal distributing means comprises filters operatively connected to said calculation means and to receive the received signal.

3. An apparatus as recited in claim 2, wherein the received signal has a received bandwidth, wherein each of said filters has a center frequency, wherein the center frequency of each of said filters is different and wherein each of said filters has a bandwidth which is narrower than the received bandwidth.

4. An apparatus as recited in claim 3, wherein the bandwidth of each of said filters is substantially identical.

5. An apparatus as recited in claim 2, wherein said calculation means comprises:

means for supplying a reference signal; and means, operatively connected to said reference signal supplying means, said filters and said averaging means, for determining a phase difference between the received signal and the reference signal.

6. An apparatus as recited in claim 5, wherein said phase difference determining means comprises:

quadrature detector circuits, respectively operatively connected to said filters, and operatively connected to said reference signal supplying means, for separating the received signal into an in-phase component and a quadrature component in each of the received signal bands; and signal conversion circuits, respectively operatively connected to said quadrature detector circuits, and operatively connected to said averaging means, for determining the phase difference using an inverse trigonometric function of the inphase component and the quadrature component of the received signal.

7. An apparatus as recited in claim 6, wherein the received signal has a variance and a standard deviation and wherein said averaging means comprises means, operatively connected to said quadrature detector circuits and said tissue characteristic means, for obtaining at least one of the variance and the standard deviation of the received signal, using the inphase and quadrature components, to be output by said tissue characteristic means.

8. An apparatus as recited in claim 5,
wherein said calculation means further comprises first differentiating means, operatively connected to said phase difference determining means and said averaging means, for differentiating the phase difference of each of the received signal bands with respect to time to generate a frequency shift amount signal for each of the received signal bands,
wherein said averaging means includes frequency averaging means, operatively connected to said phase difference determining means and said tissue characteristic means, for averaging the frequency shift amount signal for each of the received signal bands to produce an average frequency signal as the average signal characteristic, and
wherein said tissue characteristic means comprises second differentiating means, operatively connected to said frequency averaging means, for differentiating the average frequency signal with respect to time to generate an attenuation slope coefficient as the tissue characteristic.

9. An apparatus as recited in claim 5,
wherein said calculation means further comprises:
first differentiating means, operatively connected to said phase difference determining means, for differentiating the phase difference for each of the received signal bands with respect to time to generate a frequency shift amount signal for each of the received signal bands; and
second differentiating means, operatively connected to said first differentiating means and said ayeraging means, for differentiating the frequency shift amount signal for each of the received signal bands with respect to time to generate an attenuation slope coefficient,
wherein said averaging means includes frequency averaging means, operatively connected to said phase difference determining means and said tissue characteristic means, for averaging the attenuation slope coefficient for each of the received signal bands to produce an average attenuation slope coefficient as the average signal characteristic, and
wherein said tissue characteristic means includes means, operatively connected to said frequency averaging means, for outputting the average attenuation slope coefficient as the tissue characteristic.

10. An apparatus as recited in claim 2,
wherein said calculation means comprises:
means for supplying a reference signal; and
means, operatively connected to said reference signal supplying means, said filters and said averaging means, for determining a phase difference between the received signal and the reference signal, and
wherein said averaging means includes average phase means, operatively connected to said phase difference determining means and said tissue characteristic means, for calculating an average phase difference as the average signal characteristic.

11. An apparatus as recited in claim 10, wherein said tissue characteristic means comprises:
first differentiating means, operatively connected to said average phase means, for differentiating the average phase difference with respect to time to generate a center frequency signal; and
second differentiatihg means, operatively connected to said first differentiating means, for differentiating the center frequency signal with respect to time to generate an attenuation slope coefficient as the tissue characteristic.

12. An apparatus as recited in claim 2,
wherein said calculation means comprises:
means for supplying a reference signal; and
means, operatively connected to said reference signal supplying means, said filters and said averaging means, for determining a phase difference between the received signal and the reference signal, and
wherein said averaging means includes means, operatively connected to said phase difference determining means and said tissue characteristic means, for calculating a weighted phase difference as the average signal characteristic.

13. An apparatus as recited in claim 2,
wherein said calculation means comprises:
means for supplying a reference signal; and
means, operatively connected to said reference signal supplying means, said filters and said averaging means, for determining a phase difference between the received signal and the reference signal, and
wherein said averaging means include means, operatively connected to said phase difference determining means and said tissue characteristic means, for calculating an average phase difference, weighted by the in-phase component squared and the quadrature component squared, as the average signal characteristic.

14. An apparatus as recited in claim 2,
wherein each of the received signal bands has a power spectrum and said calculation means comprises:
means for supplying a reference signal;
quadrature detector circuits, operatively connected to said reference signal supplying means and respectively operatively connected to said filters, for separating the received signal into an in-phase component and a quadrature component for each of the received signal bands; and
moment calculation means, operatively connected to said quadrature detector circuits and said averaging means, for calculating moments of the power spectrum in the time domain for each of the received signal bands,
wherein said averaging means includes means, operatively connected to said moment calculating means and said tissue characteristic means, for producing the average signal characteristic using the moments calculated by said moment calculation means; and
wherein said tissue characteristic means comprises:
center frequency means, operatively connected to said averaging means, for obtaining a center frequency signal from the average signal characteristic; and differentiating means, operatively connected to said center frequency means, for differentiating the center frequency signal with respect to time to produce an attenuation slope coefficient as the tissue characteristic.

15. An apparatus as recited in claim 1, wherein said calculation means comprises autocorrelation means, operatively connected to said signal distributing means and said averaging means, for obtaining an autocorrelation function signal for each of the received signal bands.

16. An apparatus as recited in claim 15, wherein said calculation means further comprises differentiating means, operatively connected to said autocorrelation means and said averaging means, for differentiating the autocorrelation function signal for each of the received signal bands with respect to time to produce the signal characteristic.

17. An apparatus as recited in claim 15, wherein said averaging means includes means, operatively connected to said autocorrelation means and said tissue characteristic means, for calculating a weighted average as the average signal characteristic.

18. An apparatus as recited in claim 15,
wherein each of the received signal bands has a power spectrum,
wherein said calculation means further comprises moment calculation means, operatively connected to said autocorrelation means and said averaging means, for calculating moments of the power spectrum for each of the received signal bands in the time domain;
wherein said averaging means includes average frequency means, operatively connected to said moment calculation means and said tissue characteristic means, for obtaining an average frequency signal from the moments calculated by said moment calculation means; and
wherein said tissue characteristic means comprises differentiating means, operatively connected to said average frequency means, for differentiating the average frequency signal with respect to time to produce an attenuation slope coefficient as the tissue characteristic.

19. An apparatus as recited in claim 15,
wherein the received signal has a variance and a standard deviation, and
wherein said averaging means comprises means, operatively connected to said autocorrelation means and said tissue characteristic means, for obtaining at least one of the variance and the standard deviation of the received signal, using the autocorrelation function signal for each of the received signal bands, to be output by said tissue characteristic means.

20. An apparatus as recited in claim 1, wherein said signal distributing means comprises:
means for supplying reference signals, each of said reference signals having a different frequency;
quadrature detector circuits, operatively connected to said reference signal supplying means and to receive the received signal, each of said quadrature detector circuits obtaining inphase and quadrature components of the received signal for one of the received signal bands in dependence upon a corresponding one of the reference signals; and
low-pass filters, respectively operatively connected to said quadrature detector circuits and operatively connected to said calculation means.

21. An apparatus as recited in claim 20,
wherein each of the received signal bands has a power spectrum,
wherein said calculation means comprises moment calculation means, operatively connected to said low-pass filters and said averaging means, for calculating moments of the power spectrum of each of the received signal bands in the time domain,
wherein said averaging means includes means, operatively connected to said moment calculation means and said tissue characteristic means, for producing the average signal characteristic using the moments calculated by said moment calculation means, and
wherein said tissue characteristic means comprises:
center frequency means, operatively connected to said averaging means, for obtaining a center frequency signal of the received signal from the average signal characteristic; and
differentiating means, operatively connected to said center frequency means, for differentiating the center frequency signal with respect to time to produce an attenuation slope coefficient as the tissue characteristic.

22. An apparatus as recited in claim 20,
wherein the received signal has a center frequency,
wherein said tissue characteristic means includes means, operatively connected to said averaging means, for outputting the center frequency of the received signal, and
wherein said reference signal supplying means includes means operatively connected to said tissue characteristic means and said quadrature detector circuits, for varying the reference signals in dependence upon the center frequency without changing differences among the reference signals.

23. A method for detecting characteristics of a medium in the time domain using an ultrasonic wave pulse transmitted into the medium and received as a received signal after reflection by the medium, comprising the steps of:
(a) distributing the received signal into at least three received signal bands having signal characteristics; and
(b) averaging the signal characteristics of the received signal bands to produce a tissue characteristic substantially free of spectrum scalloping.

24. A method as recited in claim 23, wherein said step (a) comprises the substeps of:
(ai) filtering the received signal to produce the received signal bands; and
(aii) calculating the signal characteristics in the time domain.

* * * * *

UNITED STATES PATENT AND TRADEMARK OFFICE
CERTIFICATE OF CORRECTION

PATENT NO. : 4,648,276

DATED : March 10, 1987

INVENTOR(S) : Klepper et al.

It is certified that error appears in the above-identified patent and that said Letters Patent is hereby corrected as shown below:

Col. 2, line 49, "diclosed" should be --disclosed--;

line 51, "spectrum" should be --cepstrum--;

line 67, "58-7726" should be --58-77226--.

Col. 3, line 15, "IEEE." should be --IEEE--.

Col. 6, line 31, "$\pi$," should be --$\nu$,--;

line 41, "$(f_{e+\nu})$" should be --$(f_e+\nu)$--.

Col. 7, line 19, "$\geq$" (both occurrences) should be --$\leq$--.

Col. 8, line 51, "and root" should be --and a square root--.

UNITED STATES PATENT AND TRADEMARK OFFICE
CERTIFICATE OF CORRECTION

PATENT NO. : 4,648,276

DATED : March 10, 1987

INVENTOR(S) : Klepper et al.

It is certified that error appears in the above-identified patent and that said Letters Patent is hereby corrected as shown below:

Col. 9, line 41, "$\Phi$" should be --$\phi$--.

Col. 11, line 48, "$\dot{\phi}_R/2\pi$" should be --$\dot{\phi}_r/2\pi$--.

Col. 12, line 18, "$\delta/\delta t$" should be --$\partial/\partial t$--;

line 22, "$\delta/\delta t$" should be --$\partial/\partial t$--;

line 27, "fifth." should be --fifth--;

line 28, "$\delta/\delta t$" should be --$\partial/\partial t$--;

line 39, "$\delta/\delta t$" should be --$\partial/\partial t$--; "$<\phi_r>$" should be --$<\dot{\phi}_r>$--.

Col. 13, line 43, "$>\dot{\phi}_w>$" should be --$<\dot{\phi}_w>$--.

UNITED STATES PATENT AND TRADEMARK OFFICE
CERTIFICATE OF CORRECTION

PATENT NO. : 4,648,276

DATED : March 10, 1987

INVENTOR(S) : Klepper et al.

It is certified that error appears in the above-identified patent and that said Letters Patent is hereby corrected as shown below:

Col. 14, line 65, equation (38-2), "$2\pi(\sigma+\epsilon)$ should be $--2\pi(\nu+\epsilon)--$;

line 68, equation (38-4), "$2\pi(\nu-\epsilon)$ should be $--2\pi(\nu-\epsilon)--$.

Signed and Sealed this

Third Day of November, 1987

Attest:

DONALD J. QUIGG

*Attesting Officer*      *Commissioner of Patents and Trademarks*